United States Patent [19]

Ohno

[11] 4,161,549
[45] Jul. 17, 1979

[54] METHOD OF IMPROVING THE FLAVOR OF PREVIOUSLY DRIED GREEN COFFEE BEANS

[75] Inventor: Akira Ohno, Nagoya, Japan

[73] Assignee: Gallon & Company, Nagoya, Japan

[21] Appl. No.: 865,445

[22] Filed: Dec. 29, 1977

Related U.S. Application Data

[63] Continuation-in-part of Ser. No. 723,091, Sep. 14, 1976, abandoned, which is a continuation-in-part of Ser. No. 529,547, Dec. 4, 1974, abandoned.

[30] Foreign Application Priority Data

Dec. 7, 1973 [JP] Japan .................................. 48-137508
Jul. 19, 1974 [JP] Japan .................................. 49-83364

[51] Int. Cl.² ............................................. A23F 1/02
[52] U.S. Cl. ..................................... 426/460; 426/456; 426/466
[58] Field of Search ............... 426/595, 465, 486, 507, 426/460, 466, 419, 418, 520, 455, 456, 459

[56] References Cited

U.S. PATENT DOCUMENTS

| 1,972,184 | 9/1934 | Closmann et al. ............... 426/354 X |
| 2,343,228 | 2/1944 | Sperti ................................... 426/466 |
| 3,333,963 | 8/1967 | Moon et al. ......................... 426/486 |
| 3,345,180 | 10/1967 | Smith ............................... 426/354 X |

OTHER PUBLICATIONS

Sivetz et al., vol. 1; "Coffee Processing Technology;" The AVI Pub. Co. Inc., Westport, Conn. 1963; pp. 158, 48, 54-57.
Sivetz et al., vol. 2; "Coffee Processing Technology;" The AVI Pub. Co. Inc., Westport, Conn. 1963; p. 144.

*Primary Examiner*—Kenneth M. Schor
*Attorney, Agent, or Firm*—Dennison, Dennison, Meserole & Pollack

[57] ABSTRACT

A method of improving previously conventionally dried coffee beans before roasting is disclosed. The method is particularly suitable for treating such beans that have been subjected to adverse storage conditions and are not suitable for roasting by conventional methods. The method essentially comprises drying or tempering the previously dried green coffee beans at a first temperature and a first humidity which are determined by the conditions under which the coffee beans have been adversely stored, and then tempering the coffee beans to generally uniform temperature or humidity for flavor development under atmospheric pressure at a second temperature generally higher than the first temperature and at a second higher humidity. Tempering may be effected either under atmospheric pressure or under reduced pressure, and substantially unifies and improves the quality of green coffee beans that were stored under adverse conditions to thereby facilitate development of a consistently good flavor and aroma in the coffee beans. The drying operation under reduced pressure is especially useful when treating previously dried green coffee beans having a particularly objectionable smell.

5 Claims, 38 Drawing Figures

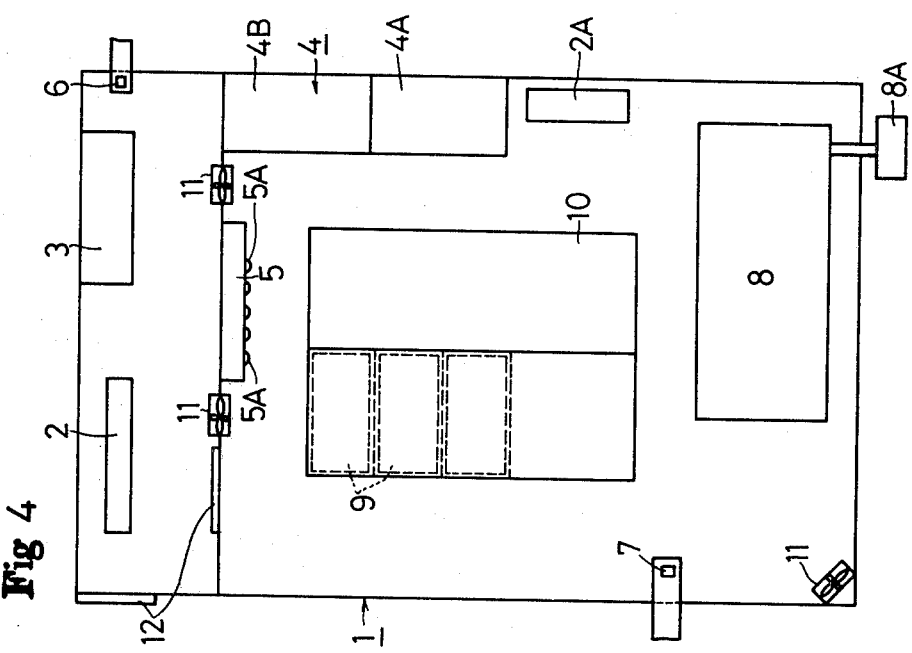
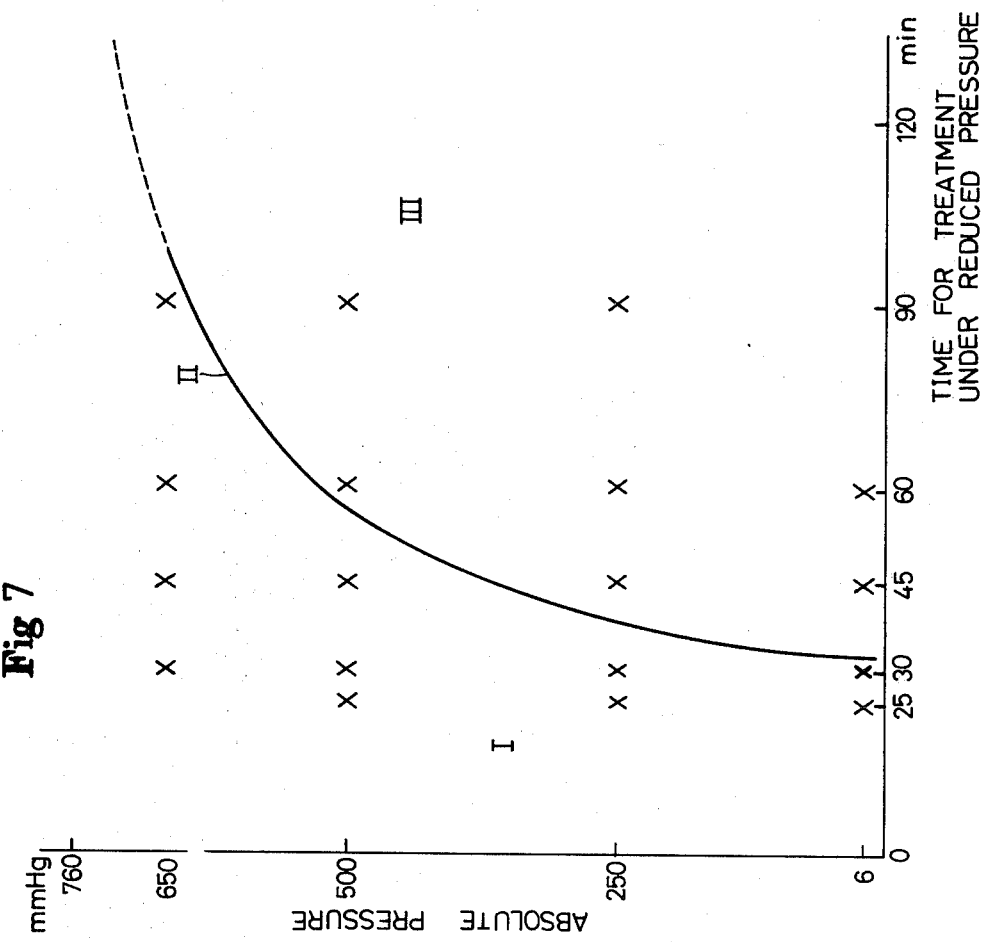

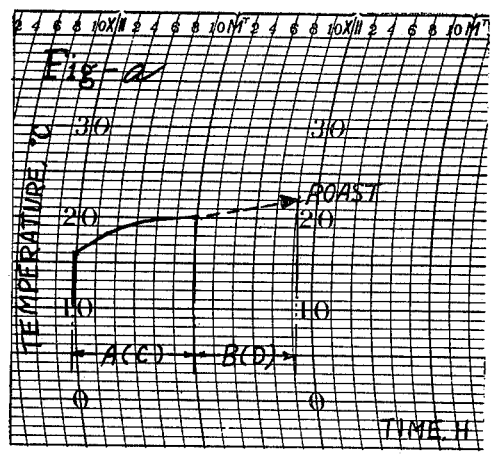
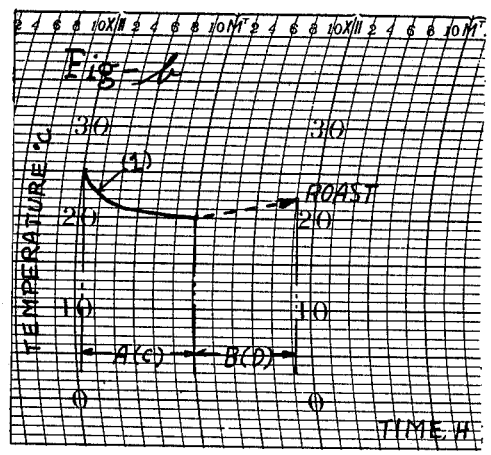
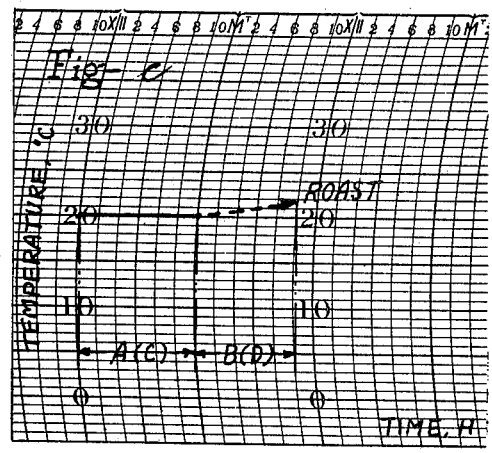

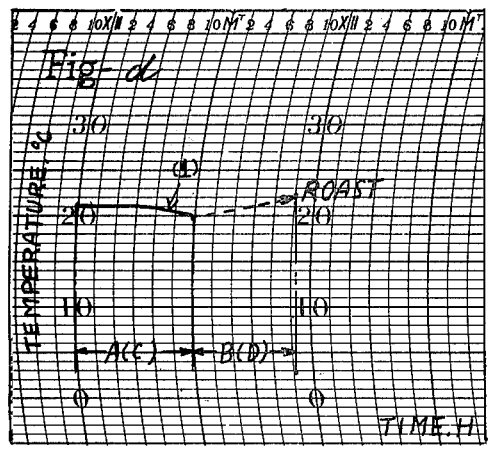
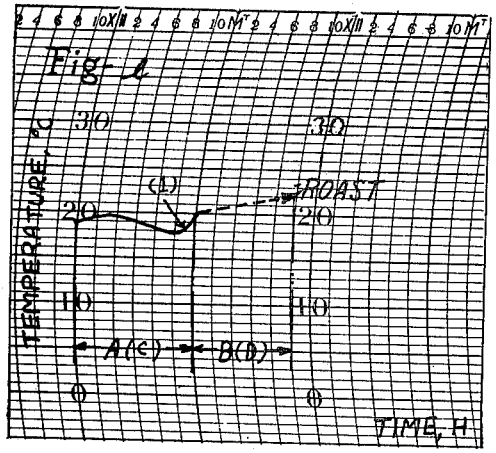
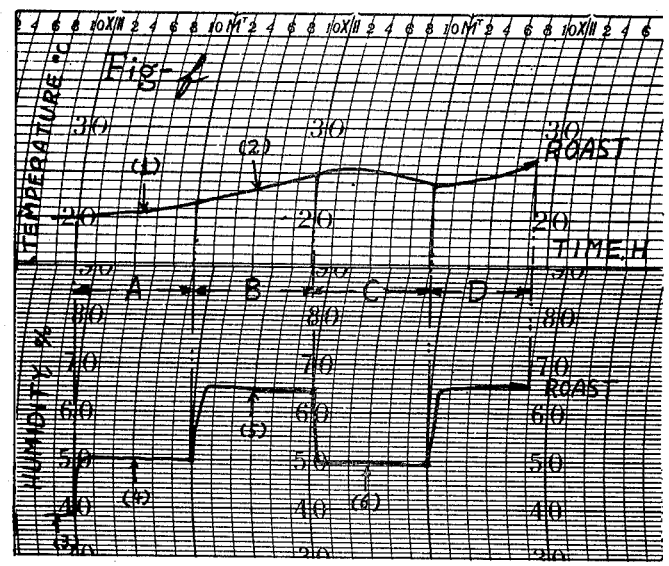

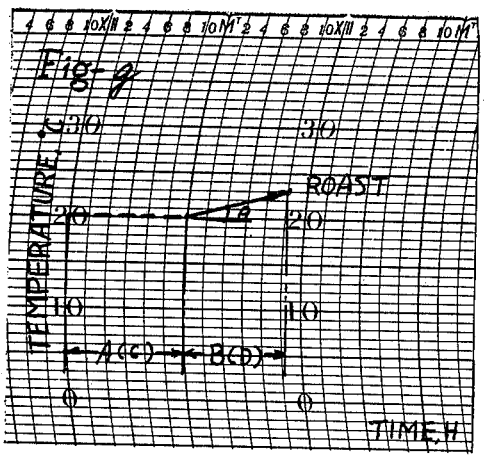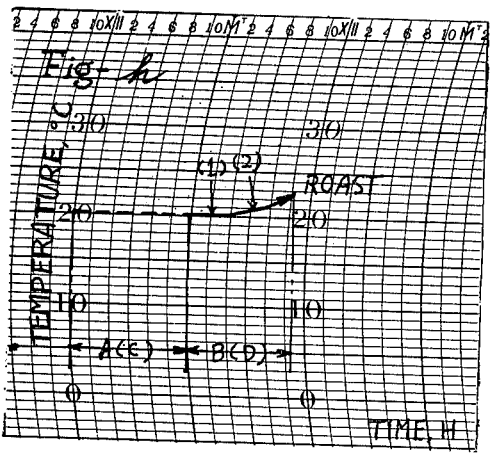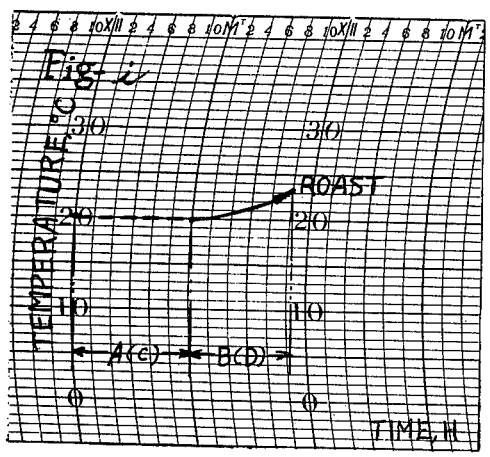

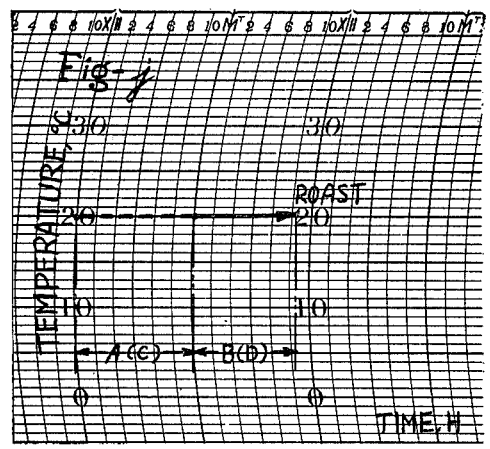
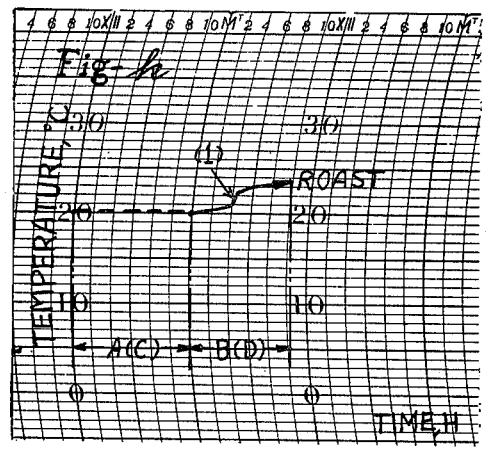
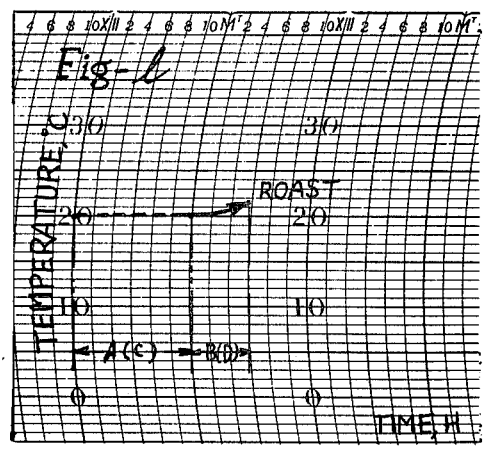

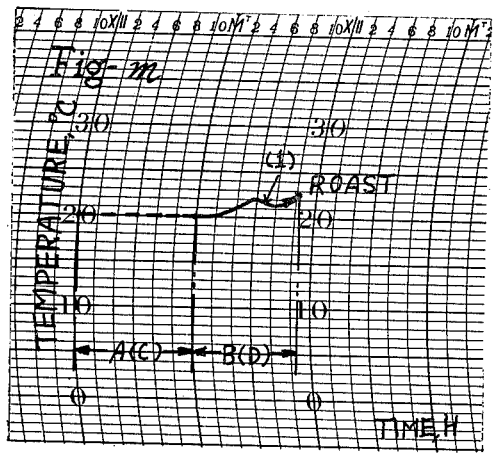
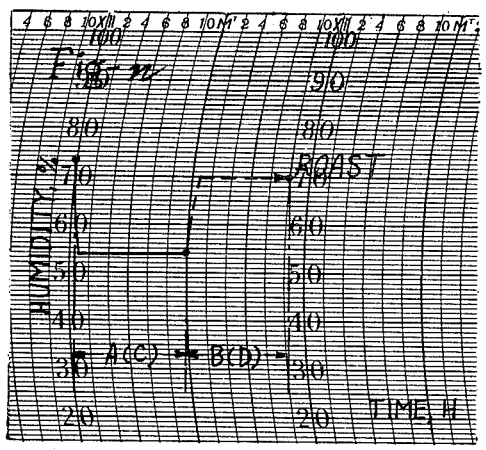
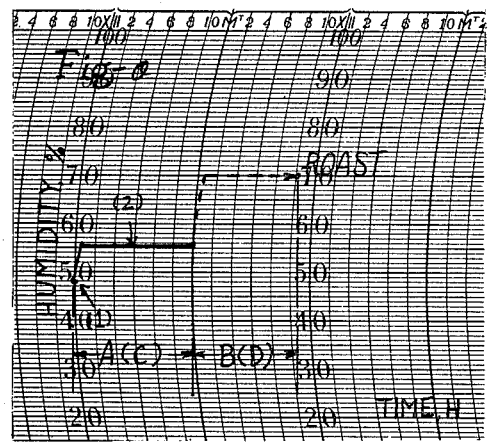

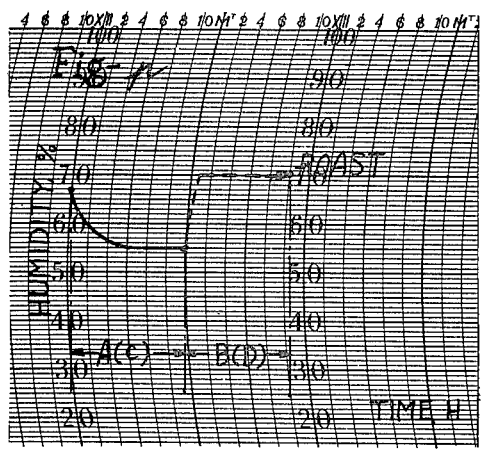
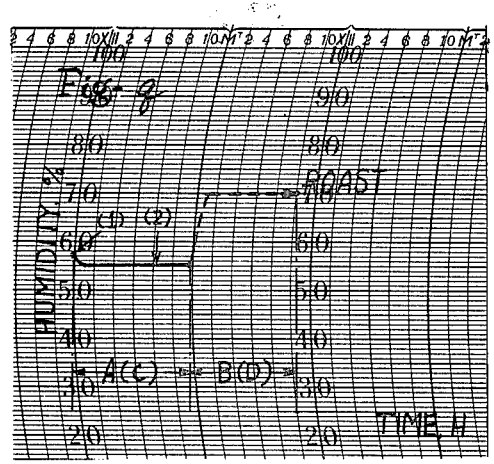
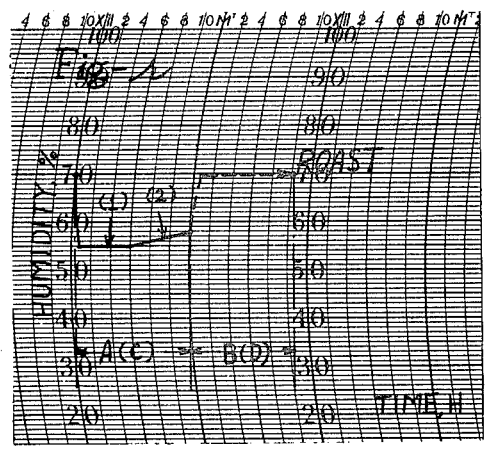

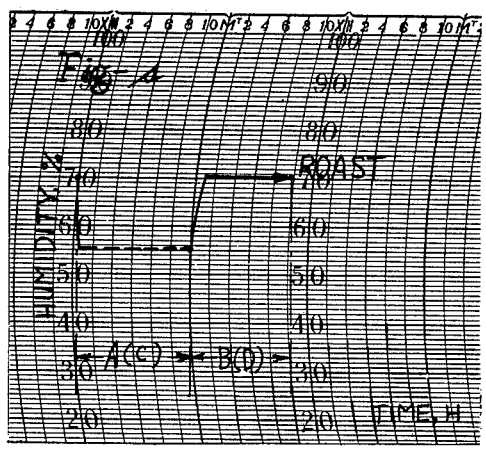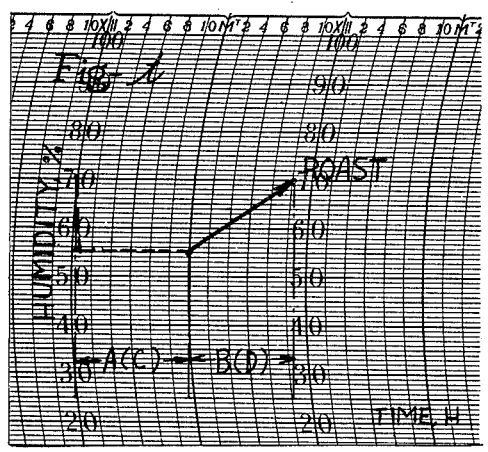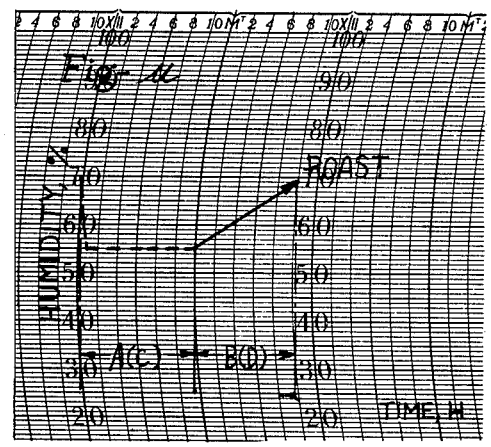

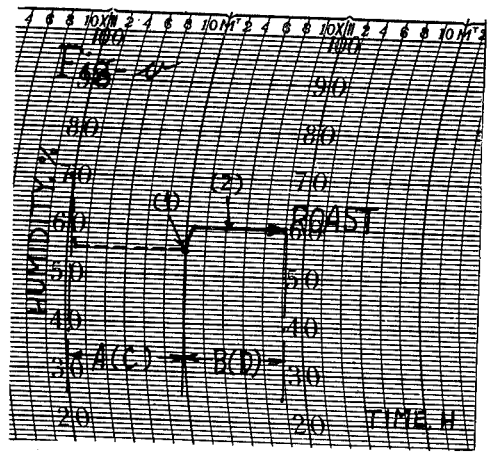
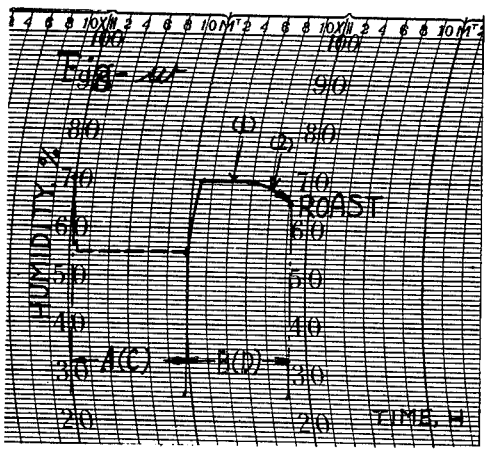

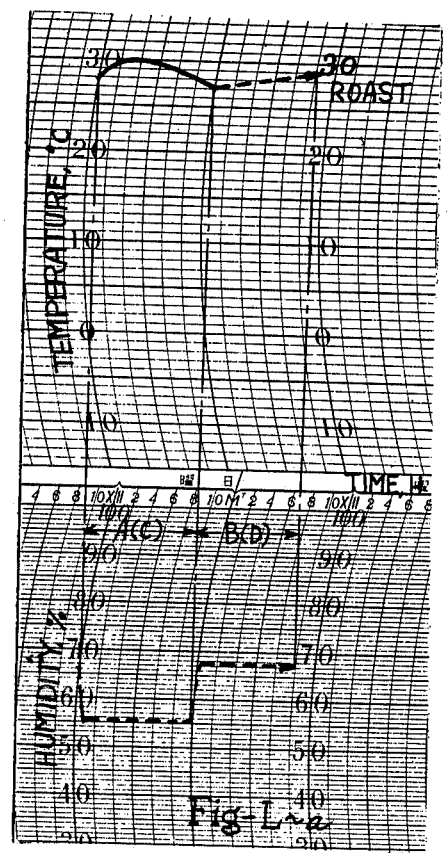
Fig-L-a
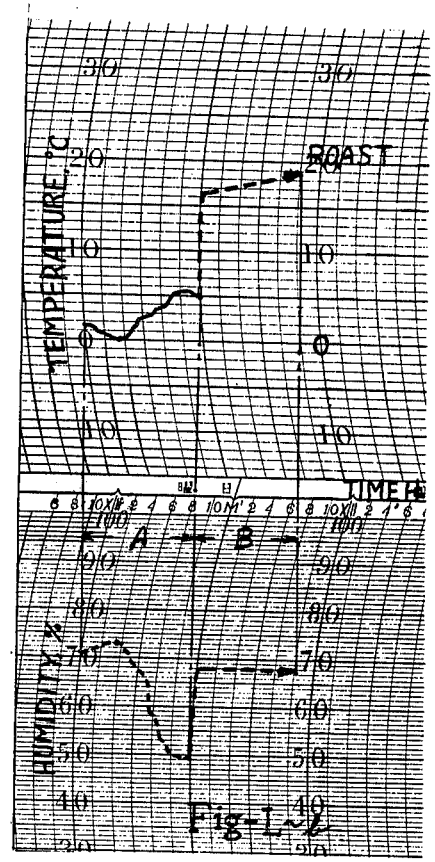
Fig-L-b
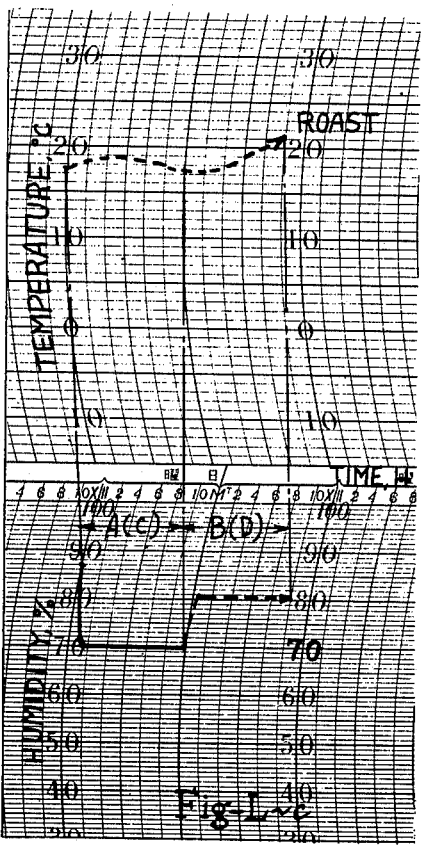
Fig-L-c
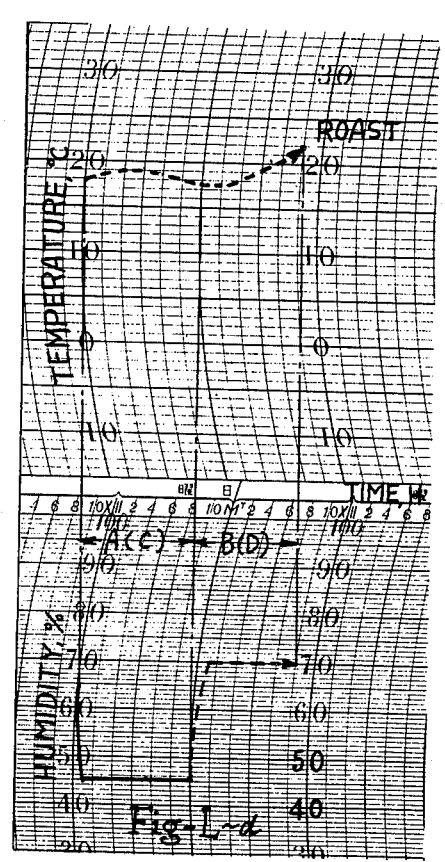
Fig-L-d

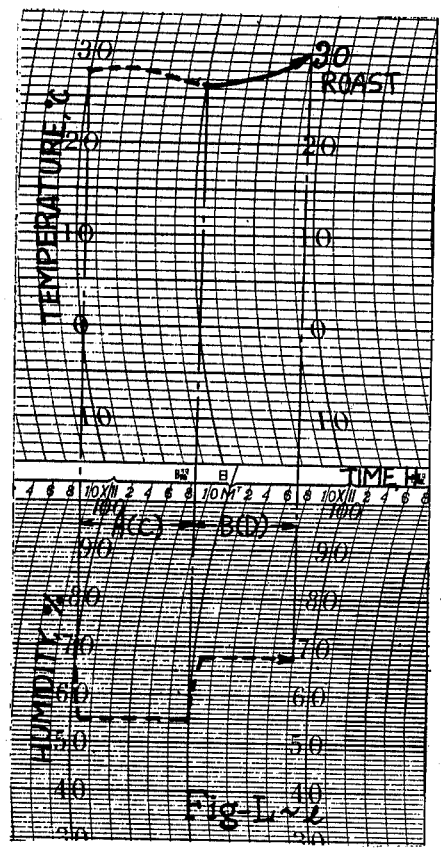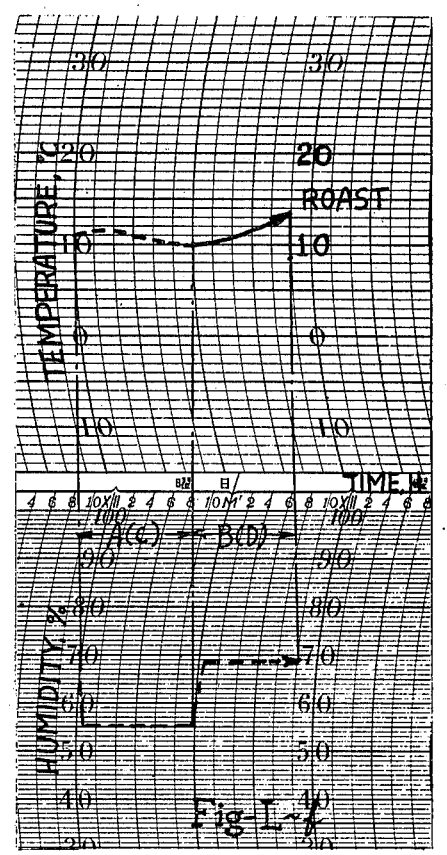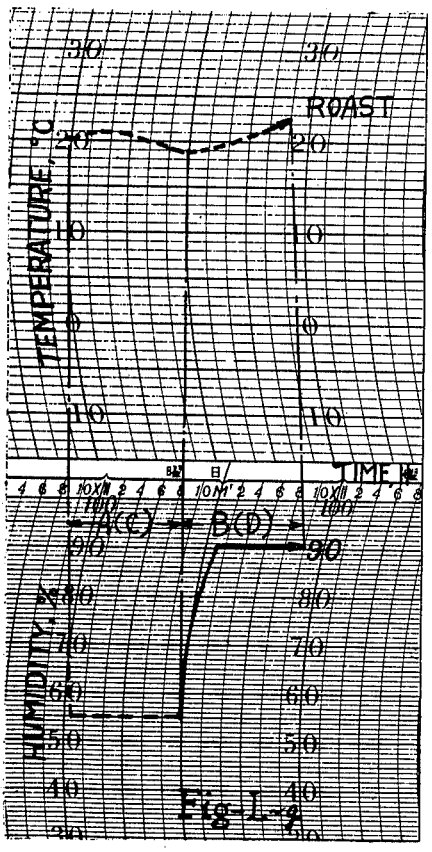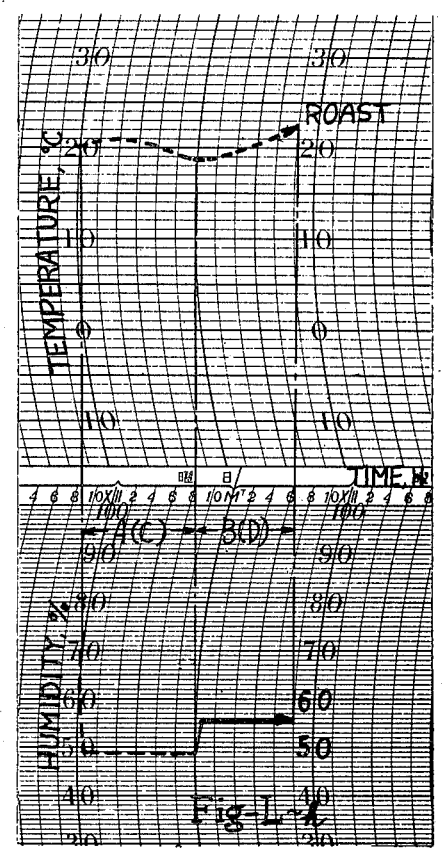

METHOD OF IMPROVING THE FLAVOR OF PREVIOUSLY DRIED GREEN COFFEE BEANS

This is a continuation-in-part of application Ser. No. 723,091, filed Sept. 14, 1976, now abandoned, which is a continuation-in-part of application Ser. No. 529,547, filed Dec. 4, 1974, now abandoned.

BACKGROUND OF THE INVENTION

This invention relates to a method of improving the flavor and aroma of previously conventionally dried undesirable green coffee beans before roasting and, more particularly, to a method of improving the flavor and aroma of previously conventionally dried undesirable green coffee beans before roasting to overcome any significant reduction in their flavor and aroma, and thus unevenness in their quality, that may be caused by varying condition which they are subjected to prior to roasting.

Green coffee beans that are dried in a conventional manner subsequent to harvesting and have desirable flavor and aroma are subsequently influenced by the ambient temperature, humidity, and ventilation available during the period of storage and/or shipment prior to roasting. The characteristics of green coffee beans, especially those which give coffee its splendid aroma and flavor, become very uneven, under adverse storage conditions when the beans are of a single species and harvested at the same time of the year. It is very difficult to satisfactorily roast and then derive a brewed coffee of consistently good flavor and aroma from such undesirable green coffee beans since the undesirable characteristics of green coffee beans subjected to adverse storage conditions are carried forward into the brewed coffee. It is known that it is not a completely satisfactory solution to those problems to merely store green coffee beans in an environment in which an appropriate temperature, humidity and an adequate ventilation are maintained to render the beans desirable for roasting.

Various attempts have been made to solve this problem by changing the conditions of the roasting process, but none of them have been very successful.

U.S. Pat. No. 1,972,184 to Closmann et al. is understood to teach an improvement in the double roasting method wherein coffee beans are first preroasted for a duration of about 20 to 50% of the time usually necessary for a normal roasting process and then treated by steam to remove injurious substances. The double roasting method is used to drive out the undesirable flavor by virtue of coffee beans being preroasted at a predetermined degree and then removed from the roaster. The patent is understood to teach another method on which green coffee beans are treated by steam just before roasting. It has been determined that these methods are sometimes successful in deriving good flavor but that it is difficult to predictably and consistently provide a uniform flavor in accordance with the teachings of the Closmann et al. patent.

U.S. Pat. No. 1,499,780 to Oprean, which teaches methods somewhat similar to the methods of the Closmann et al. patent, relates to an improvement in the double roasting method wherein cold water is sprayed over the coffee beans in the roasting process to remove undesirable substances. U.S. Pat. No. 3,345,180 to Smith is understood to teach a method in which pressure is controlled in the roasting and cooling process to select the constituents to be removed. U.S. Pat. No. 2,343,228 to Sperti is understood to teach a method in which coffee beans are heated under reduced pressure during the first portion of a roasting process. However, the coffee beans treated by the process of Sperti are no longer green beans. U.S. Pat. No. 1,640,648 to Cross is understood to teach a method in which coffee beans are treated with alkaline substances to decaffeinize the coffee, which method is quite different from that disclosed in the present invention.

Sivetz et al. in Volume 1 of the treatis *Coffee Processing Technology*, the AVI Publishing Company, Inc. 1963, in Chapter 5 entitled "Machine Drying of Coffee", deals with the drying of freshly harvested coffee beans. In this regard, particularly at Pages 116, 117, and 121 through 123, various general principles of machine drying, the optimum drying conditions, and the drying capacity of air used in such procedures are discussed. However, as is recognized in the art, freshly harvested coffee beans such as those conventionally dried by the teachings of Sivetz et al. are sometimes subjected to a fermentation process or more commonly stored for long periods of time under adverse conditions. Frequently the most adverse storage conditions are encountered in shipment of the dried coffee beans from the region where they are grown and dried to a distant market where the dried beans are further processed and roasted. Thus, while unprocessed dried coffee beans are technically "green" coffee beans there is in fact a vast difference between the characteristics of green coffee beans just subsequent to the processing as by the teachings of Sivetz et al. and green coffee beans processed by the teachings of Sivetz et al. and subsequently subjected to adverse strong conditions prior to roasting.

The following table shows a comparison of the characteristics of the coffee brewed from previously conventionally dried undesirable green coffee beans treated before roasting by the process of this invention, by the process of Sivetz et al. and by the combined process of Sivetz et al. and Closmann et al., which comprise the results of comparative tests and organoleptic assessment.

| Characteristics | Process of this Invention | Process of Sivetz et al. | Process of Combined Sivetz et al. & Closmann et al. Processes |
| --- | --- | --- | --- |
| Taste and Smell | Rich natural flavor and excellent relish. | Poor natural flavor and no relish. | Poor natural flavor and no relish. |
| To the Tongue | Soft and Pleasant. | Rough and Unpleasant. | Intermediate. |
| Storability of roasted beans and ground beans | Slightly inferior. | Better than conventionally treated beans. | Good. |

| | -continued | |
|---|---|---|
| Other characteristics (relative to brewing) | Most suitable for brewing coffee in a small quantity in a short time at home or elsewhere. | Suitable for brewing coffee over a longer time in a relatively large quantity for commercial purposes. |

In summary, the process of Sivetz et al. is concerned merely with the removal of some undesirable substances from freshly harvested coffee beans. The processes of Sivetz et al. and the steam distillation of Closmann et al., when combined merely provide a process for double removal of undesirable substances without any step for developing a new and desirable flavor.

Green coffee beans desirable or suitable for roasting may be defined as those which can impart to the coffee brewed from roasted beans a good fragrance, a splendid taste, a pleasing smell or aroma and a quality of being soft and pleasant to the tongue. Visual inspection of green beans does not generally permit evaluation of the beans with respect to those qualities. But people experienced in the art of coffee production can generally judge the quality of dried green beans by the aroma. Desirable green coffee beans have a strong desirable smell of fermentation, while bad beans have a poor flavor or give out an offensive smell. It is well known in the art of coffee roasting that brewed coffee which is excellent in both taste and smell or aroma can be derived from roasting green beans having a strong desirable smell, while green beans having a weak or poor smell or aroma make only brewed coffee which is inferior in both taste and smell.

It has been recognized as necessary to subject undesirable green coffee beans to some special treatment before roasting to avoid the unevenness in the quality thereof as far as possible, while developing the flavor or aromatic qualities inherent in green coffee beans, and some effective method of such treatment has long been awaited.

SUMMARY OF THE INVENTION

While the present invention provides a method of removing undesirable substances from green coffee beans and developing a good flavor in them, the method of this invention provides equally good results for the treatment of green coffee beans stored under adverse conditions as for those stored under optimum storage conditions wherein the beans have become entirely odorless due to escape of undetermined constituents. The method of this invention essentially comprises a step of drying undesirable previously dried green beans and a step of developing a good flavor and aroma in the beans treated in the first mentioned step. By virtue of treatment by these two steps, undesirable green beans are converted into green beans predictably and consistently suitable for roasting. The chemical mechanism of such conversion, i.e., what changes may occur to which constituents of beans to render them suitable for roasting is not known, but such does not detract from the fact that it has been found that it is always possible to obtain desirable green coffee beans if they are treated in accordance with this invention. In other words, the undesirable characteristics of previously conventionally dried green beans that were subjected to adverse storage conditions are removed during treatment by the first mentioned step of drying as effected under the conditions to be set forth, and desirable characteristics are given to the beans upon treatment by the second mentioned step of flavor development as effected under the conditions to be set forth. The parameters for the first step are significant, but more particularly, the second step of flavor development must be carried out under the following conditions:

The treatment must be accomplished within specified temperature and humidity ranges;

There must take place an increase in the water content of beans, after reduction during the drying step, which further humidifying of the beans must extend over a predetermined length of time;

The treating temperature must be equal to or higher than that employed during the drying step;

There must be a sufficient ventilation or circulation of air to assure maintenance of the treatment atmosphere within the predetermined parameters;

Beans must not be roasted before the flavor development step has continued for a predetermined length of time. More specifically, during the flavor development step, the temperature should preferably be kept constant or increased, because any substantial drop in temperature gives a strong astringency to the beans and the coffee brewed therefrom lacks desirable flavor and aroma. No appreciable astringency is developed if such temperature drop is kept within about 1° C. per hour, but any greater temperature drop must be avoided because it develops a recognizable astringency in the beans treated. Reduction in humidity is not particularly desirable for flavor development, either, though its influence is not so great as is a drop in temperature. A humidity reduction of about 1% per hour does not have any adverse effect on the beans treated. The humidity reduction produces an adverse effect when it has become as much as, for example, about 3% per hour.

It is thus a principal object of this invention to provide a method of improving the flavor of previously dried undesirable green coffee beans, in which the beans are subjected to a preroasting process comprising a series of steps under predetermined conditions of temperature and humidity to make them uniform in their flavor and aroma characteristics to render the beans desirable for roasting by conventional procedures.

It is another object of this invention to provide a very efficient method of improving the flavor of previously dried green coffee beans having a particularly undesirable flavor or lack of flavor, in which the beans are subjected to a novel treatment and are thereby given uniform excellent flavor characteristics in preparation for roasting.

The above stated objects are attained by a method broadly comprising placing undesirable green coffee beans in an environment under atmospheric pressure at a first predetermined temperature and a first predetermined humidity which are within parameters that have been determined to consistently render desirable beans that have been subjected to adverse conditions, whereby the beans are dried, and then treating the beans in a second environment under atmospheric pressure and at a generally equal or somewhat higher temperature, and at a second somewhat higher humidity than those of the environment for the drying step, for a length of time not less than six hours, whereby the beans acquire excellent flavor and aroma characteristics.

The object of very efficiently carrying forth the method of the invention may be attained by modifying the first step of the method by placing previously conventionally dried undesirable green coffee beans for a length of time ranging approximately from 30 to 110 minutes in an environment under pressure lower than the atmospheric pressure and having a predetermined temperature and a predetermined humidity as broadly set forth above whereby any particularly undesirable flavor of the beans is removed, and then treating the beans in a second environment under atmospheric pressure under the conditions as broadly set forth above. This embodiment of the method of the invention is especially useful for treating green coffee beans stored under very badly controlled conditions and having a particularly undesirable flavor. The treatment for removal of the undesirable flavor by this embodiment of the invention can be effected in a much shorter period of time than that required for the above described first embodiment of the invention.

According to this invention, it is possible to provide green coffee beans with any desired flavor characteristics by suitably controlling the conditions under which they are treated. Green coffee beans acquire a uniform splendid flavor when treated by the method of this invention. Accordingly, it is possible to easily produce coffee beans capable of being roasted with uniformly good results by conventional roasting processes without having to resort to modifying the roasting procedure to compensate for green coffee beans stored under different conditions and having different characteristics. A further advantage of the method according to the invention resides in the capability of preparing for roasting coffee beans having a substantially uniform quality at any time of the year. Coffee beans treated by the method of the invention, and subsequently conventionally roasted and ground, permit even an inexperienced person to readily and reliably brew coffee having a splendid flavor and aroma. The invention is particularly suitable for treating coffee beans for brewing coffee in relatively small quantity, such as in the home.

Other aspects and advantages of the invention will become apparent from the detailed description following hereinafter, and the accompanying drawings.

BRIEF DESCRIPTION OF THE DRAWINGS

FIG. 4 is a schematic plan view showing a preferred form of apparatus employed to carry out the embodiment of the method illustrated in FIGS. 2 or 3;

FIG. 7 is a graph showing the relation between pressure and time employed during the treatment under reduced pressure according to the methods illustrated in FIGS. 2 or 3.

Figure 1:
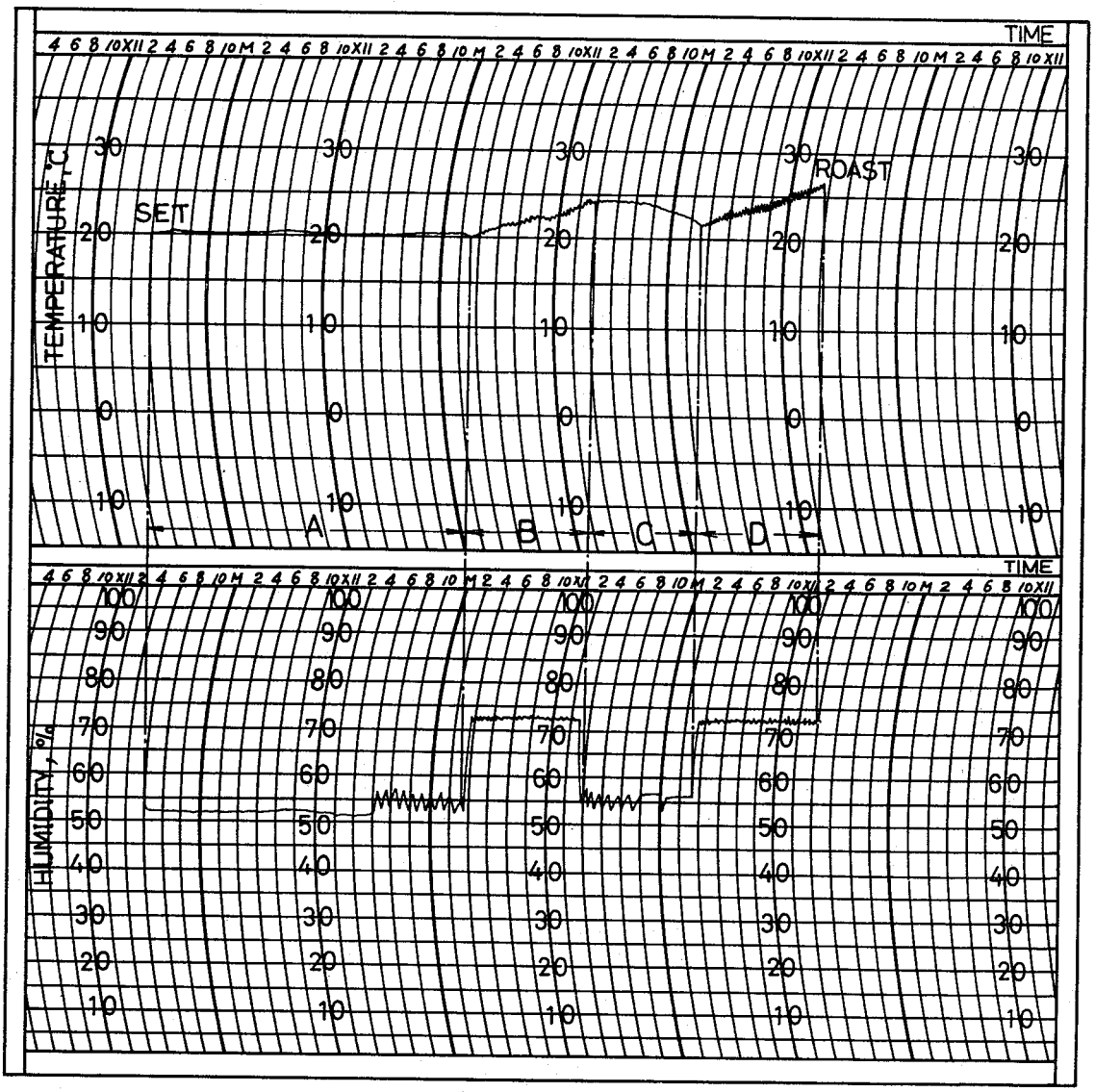
FIG. 1 shows graphs illustrating the control performed with respect to the temperature and humidity, respectively, of the air in the apparatus employed to carry out one embodiment of the method according to the invention.

FIGS. a through w and L-a through L-h are a series of graphs illustrating examples of treatment of undesirable green beans under various specific conditions of treatment at the temperature, humidity or temperature and humidity for the periods of time graphically shown thereon.

DETAILED DESCRIPTION

The method of this invention comprises as essential steps at least the following two steps:

(a) subjecting previously conventionally dried undesirable green coffee beans in a first step to an environment at a first temperature and humidity in a predetermined temperature and a predetermined humidity range for a minimum predetermined length of time to dry them uniformly, i.e. temper them to uniform properties, to thereby reduce and rectify any unevenness in the quality of the beans that is caused by their storage in different adverse environments, i.e., temperature, humidity and other ambient conditions that adversely effect the flavor of the beans, while at the same time removing any undesirable smell from the beans; and (b) then subjecting the beans in a second step in another environment at a second temperature generally equal to or higher than the first temperature and a humidity higher than the first humidity in the predetermined temperature and humidity ranges employed in the first step, for a second minimum predetermined length of time to temper them uniformly and develop a good flavor and aroma in the beans so as to render the beans consistently desirable for conventional roasting.

The method of treatment according to this invention may be carried out in two modes. One mode is to effect the treatment as a whole under atmospheric pressure and the other is to effect a portion of the treatment under reduced pressure.

According to the first mode in which the method of this invention may be put into practice, previously conventionally dried undesirable green coffee beans are treated in an apparatus of which the interior is under atmospheric pressure and the temperature and humidity can be suitably controlled. The apparatus may be a room-like structure or enclosed space within which the beans may be placed. The temperature and humidity of the air in the apparatus are controlled in a first step within predetermined levels which depend upon the moisture content of the undesirable green coffee beans to be treated. Generally, the temperature may approximately range from 0° C. to 30° C. and the humidity from 45% to 70%. The beans are kept in the apparatus for a length of time not less than about six hours to temper them to a uniform dryness, i.e., percentage humidity. Then, in a second step the temperature is equal to or higher than the first temperature and the humidity of the atmosphere within the apparatus is increased to somewhere in the approximate range from 10° C. to 30° C. and from 55% to 90%, respectively. The beans are kept in the apparatus for a length of time of less than about six hours and a good flavor and aroma is developed in the beans. As previously dried undesirable green coffee beans are dried in a controlled atmosphere, any unevenness in the quality of the beans caused by different ambient conditions during the period of their storage can be reduced and the qualities of the beans are made substantially even. It will thus be appreciated that the beans are tempered to uniform, i.e., "substantially even" temperature and humidity. The beans thus dried are then treated at an equal or a higher temperature and with a higher humidity, whereby they acquire an improved flavor and aroma to render them desirable for roasting.

The equal or higher temperature employed in the latter hal or second essential step of the method may be either maintained constant or raised gradually. Although, as will be discussed, the second temperature in the second step may be permitted to drop within certain parameters. The humidity in the second essential step of the method must be higher than that employed in the first essential step of the method and must not be lower than about 55%. If any temperature drop outside the parameters to be discussed should take place during the treatment during the second essential step at an equal or higher temperature and with a higher humidity, it is necessary to lower the humidity in order to effect successful development of a good flavor in the beans. It will thus be appreciated that the heating and further humidifying in the second essential step of the method is accomplished without significant reduction in the temperature below the above noted 0° C. to 30° C. By significant reduction in temperature it is meant that during this step the temperature drop is kept to a maximum of about 1° C. per hour. Should the humidity remain unchanged or be further increased beyond a humidity in the range set forth, the coffee beans acquire a poor flavor and a bitter taste. It is also necessary to maintain proper ventilation in the apparatus throughout the operation by purging the apparatus with a fresh supply of air, i.e., maintaining sufficient circulation of air, while maintaining the predetermined parameters of the steps of the process. The beans thus treated for flavor development as above for a predetermined length of time by the at least two essential steps are then inspected organoleptically. If the results of the inspection show that they are still lacking desirable flavor and aroma, the treatment is continued for an extended length of time. It should, however, be noted that if the beans are treated for too long a time, the treatment will give an adverse effect and the beans will lose a part of the good flavor which they have acquired. In this respect the duration of this extended treatment should preferably not exceed about 24 hours. In a situation where the beans are so undesirable so that the treatment by the above two essential steps fails to develop a desired flavor, the still undesirable coffee beans are again dried at preferably the same, but alternatively a lower, temperature and under a lower humidity within the ranges of the first essential step and again subjected to treatment for flavor development in the same manner as described above with respect to the second essential step.

The invention will now be specifically described by way of examples as follows:

Colombia Medellin Excelso, Mocca Harrar Long Berry, Brasil Santos Colorado and Java Robusta WIB No. 1 are mixed in the ratio of 4:4:3:1 by weight to prepare a sample mixture of previously conventionally dried green coffee beans weighing 40 kg in total. The coffee beans of each type used are those exposed to the high temperature and high humidity, such as normally encountered in summer, during their storage and have an undesirable smell and are unsuitable for roasting. Four boxes made of plastic material are prepared. Each box measures 64 cm long, 38 cm wide and 15 cm deep and its bottom has a multiplicity of apertures for ventilation. A piece of thick, permeable cloth, such as hemp cloth is placed in the bottom of each box. Each box is supplied with 10' kg of the above mixture of undesirable coffee beans and the beans are leveled to form a layer of beans having a substantially uniform thickness of about 6 cm. A piece of thick, permeable cloth, such as hemp cloth, is placed over the top of each box to cover the layer of the beans therein. The four boxes are then placed on a rack provided 30 cm above the floor of an air-conditioned room. The air-conditioned room measures 150 cm wide, 400 cm long and 300 cm high and is equipped with a heating device, a cooling device and a humidifying and dehumidifying device. The temperature and humidity of the air in the room are each controlled automatically to a predetermined level which may be previously set on a time switch or the like. The floor of the room is provided with a hole for letting air into the room and the ceiling has a hole provided for letting air out of the room. The room further includes a plurality of fans which are operable to uniformly stir the air in the room.

The temperature of the room is set to about 20° C. and the humidity to about 52% as illustrated in FIG. 1. The green coffee beans are left in the room for 33 hours as indicated at section A in FIG. 1 and allowed to temper to a uniform dryness. Then, the room temperature is gradually raised to about 25° C. over 13 hours with an increased uniform humidity of about 73% and the coffee beans are treated for flavor development during this period of time as indicated at section B in FIG. 1. In this particular example, the coffee beans acquired only a poor flavor at the end of the treatment indicated at section B. Therefore, the temperature and the humidity were lowered and the drying process was repeated for 11 hours as indicated at section C in FIG. 1. Then, the temperature and the humidity were raised again and the treatment for flavor development was repeated for 12 hours as indicated at section D in FIG. 1, whereby the coffee beans acquired a desirable flavor and aroma. The green coffee beans thus treated were roasted in a conventional manner, i.e., at about 190° C. for 15 minutes and coffee having a splendid flavor was obtained from the ground beans. Proper ventilation was maintained in the room throughout the operation by letting air in through the hole in the floor at a rate of 25 m$^3$ per hour and letting air out through the hole in the ceiling at a corresponding rate.

Reference is then made to another example of the above-mentioned first mode. Flavor development was made for 7 groups of the same green coffee beans as those in the above first example which had had undesirable smells and become unsuitable for roasting due to exposure to such high temperature and high humidity as normally encountered in summer during their storage. The amounts of the green coffee beans in the first to 7th groups were 1 kg, 15 kg, 30 kg, 45 kg, 60 kg, 65 kg and 70 kg, respectively. The coffee beans of the first group were all kept in one plastic box, while those of the other groups were kept in one plastic box per 5 kg. The top of each box containing the coffee beans was covered with a piece of cloth and all the boxes were placed on a rack provided in the same air-conditioned room as in the first example. The plastic boxes, cloth and rack used were also the same as used in the first example. The flavor developing treatment was made in order of the first to 7th groups with the same ventilation through the room as in the first example. Temperature and humidity conditions and time for the drying and flavor developing operations were maintained as near to those in the first example as possible. The green coffee beans thus treated of each group were roasted at about 190° C. for 15 minutes.

Taste panel test was made for the coffee brewed from each group of the green coffee beans thus treated in comparison with the coffee brewed from the reference beans prepared in the same manner as in the above second example using the same materials, but not treated in accordance with the above-mentioned method before roasting. The latter or reference coffee was that previously selected as having particularly good flavor by previous panel test. The panel for the taste panel test was composed of 15 men and 15 women aged between 20 and 45. Results of this test were as follows:

| Comparison | Number of the members who chose the preferable one | Comments on two coffees by panel |
| --- | --- | --- |
| Reference coffee | 13 | Nice-smelling, but not so good-tasting |
| 1 Coffee of 1st group | 17 | Nice-smelling, tastes sweet and refreshing |
| Reference coffee | 14 | |
| 2 Coffee of 2nd group | 16 | Same as for 1st group |
| Reference coffee | 15 | |
| 3 Coffee of 3rd group | 15 | Same as for 1st group |
| Reference coffee | 15 | |
| 4 Coffee of 4th group | 15 | Same as for 1st group |
| Reference coffee | 14 | |
| 5 Coffee of 5th group | 16 | Same as for 1st group |
| Reference coffee | 15 | |
| 6 Coffee of 6th group | 15 | Not very nice-smelling and not very good-tasting |
| Reference coffee | 21 | |
| 7 Coffee of 7th group | 9 | Rather nice-smelling and good-tasting, but gives unpleasant feeling |

It can be seen from the table that the coffee brewed from the coffee beans of the 1st to 6th groups is superior or equal to the reference coffee in flavor. Thus, it can be understood from the above-described example that this invention makes it possible to treat green coffee beans in the amount of up to 65 kg under the circulation of air through the treatment chamber at a rate of 25 m³ per hour so that desirable results can be obtained.

According to the first mode in which the first and second essential steps of the method of this invention may be carried out at atmospheric pressure in the treatment chamber, it will be noted that the first essential step of drying of previously conventionally dried undesirable green coffee beans at a predetermined temperature and with a predetermined humidity, within the previously discussed temperature and humidity ranges, will substantially unify the differences in their qualities caused by the different conditions of their adverse storage and facilitate the subsequent treatment thereof in the second essential step for their flavor development at a higher temperature and with a higher humidity. Thus, the coffee beans treated acquire a fresh favorable flavor and aroma and when beans treated by this invention are used, it is quite easy to consistently brew coffee having a uniformly splendid flavor and aroma. It is also possible in accordance with the invention to develop flavor of a desired nature in coffee beans by varying the mode of control effected on the temperature and humidity of the air in the apparatus for treatment. The method in its basic mode as hereinabove described is further advantageous in the simplicity of the apparatus required, since the whole operation can be performed under atmospheric pressure. It is further to be understood that the method described is equally effective, irrespective of the mixing ratio of different types of coffee beans without being limited to the ratio mentioned in the foregoing example.

The second mode in which the method of this invention may be carried out is specifically featured by the treatment under reduced pressure of green coffee beans having a particularly objectionable flavor, aroma, or lack of aroma, whereby the objectionable flavor can be more readily removed prior to carrying forth the second essential step of the method. This second mode is very efficient because of its considerably shortened operating time as compared with that required for the first mode hereinbefore described. According to the second mode, a part of the operation, namely the first essential step of drying or tempering is carried out under reduced pressure, while in the first mode, the entire operation is performed under atmospheric pressure. The method now being described requires additional equipment, such as a pressure reducing device and reduced pressure chamber. It is, however, advantageous because treatment under reduced pressure considerably shortens the time required for drying or tempering previously conventionally dried undesirable green coffee beans and facilitates quick removal of any particularly objectionable smell acquired by the coffee beans during their storage under adverse conditions.

Figure 2:
FIG. 2 is a flow diagram illustrating another embodiment of a step of the invention.
Figure 3:
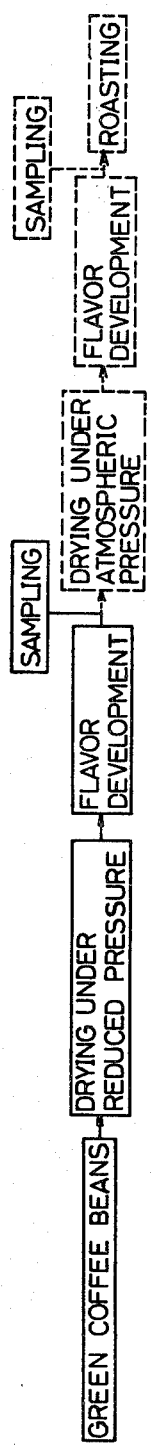
FIG. 3 is a flow diagram illustrating an embodiment of the method of the invention incorporating the step shown in FIG. 2.

The undesirable green coffee beans are treated in an environment under reduced pressure for a predetermined length of time and any particularly undesirable flavor is effectively released from the coffee beans as illustrated in FIG. 2. Since it is desirable to develop a uniform good flavor and aroma in the coffee beans after removal of the undesirable flavor and aroma therefrom, the coffee beans are then treated under atmospheric pressure, for a length of time not less than six hours at a higher temperature and with a higher humidity as illustrated in the full line portions of FIG. 3. The preceding treatment under reduced pressure may be effected at a temperature approximately ranging from 0° C. to 30° C. The pressure may be reduced to somewhere in the approximate range from 6 mm Hg to 650 mm Hg. Thus, the temperature and the humidity employed in the succeding step under atmospheric pressure may approximately range from 10° C. to 30° C. and from 55% to 90% respectively. It will be noted that any differences in the qualities of previously conventionally dried undesirable green coffee beans due to their storage under different temperature, humidity and other adverse ambient conditions may be substantially unified by allowing the coffee beans to dry, or temper, under reduced pressure, and that if further required, which is generally the case, the dried coffee beans may be subjected to further treatment under atmospheric pressure in accordance with the second above discussed step for their fresh flavor development before they are roasted. The dryness of coffee beans obtainable by drying under reduced pressure depends upon the reduced pressure employed and the length of time spent for the treatment. According to the second mode of the method of this invention, it is, therefore, possible to achieve effective treatment of undesirable green coffee beans having different kinds of particularly objectionable characteristics by utilizing an a appropriate combination of reduced pressure and time. The lower the pressure employed, the less time the drying operation will require. It is, however, to be noted that if the time spent for the drying operation under reduced pressure is too short, an objectionable flavor or smell with not fully be released from coffee beans, will partially be retained in the beans. Any residual objectionable smell with make it difficult to develop a favorable flavor in the beans during any subsequent flavor developing treatment. Likewise, it is difficult to develop a good flavor or aroma if the time spent for any preceding drying operation is too long.

As will be appreciated from the foregoing, temperature and humidity are factors which can have an important effect on the flavor developed in green coffee beans after drying under reduced pressure. If drying under reduced pressure is effected at too high a temperature, coffee beans only acquire a poor flavor or aroma. Therefore, drying under reduced pressure should be effected at a temperature which is maintained relatively low. During treatment under reduced pressure, humidity should preferably be maintained relatively low in order to allow coffee beans to dry satisfactorily. The temperature should also preferably be maintained relatively low in view of the temperature employed during the subsequent flavor development under atmospheric pressure. The temperature employed during the flavor developing treatment under atmospheric pressure is equal to or higher than that utilized during the preceding treatment under reduced pressure.

As discussed previously a salient aspect of the invention resides in the fact that during the treatment under atmospheric pressure, the temperature may be either maintained substantially constant or increased gradually. The humidity must be maintained at a higher level than that employed during the preceding drying operation under reduced pressure. In other aspects of the treatment under atmospheric pressure, such as temperature, humidity and ventilation of the treatment chamber, reference will be made to the foregoing description of the equivalent treatment employed in the first mode of practising the invention.

After treatment under reduced pressure and then under atmospheric pressure, the coffee beans are inspected by sampling with respect to their appearance and aroma. If inspection indicates any insufficiency of flavor development, the treatment under atmospheric pressure is continued or repeated for their further improved flavor development. Should the coffee beans thus treated still fail to present a satisfactorily good flavor, which may be the case with particularly undesirable beans, the first and second steps of the method are repeated, but with drying under reduced pressure being replaced by drying under atmospheric pressure and effected at preferably the same, but alternatively a lower temperature and with a lower humidity, while the subsequent flavor developing treatment under atmospheric pressure is effected in the same manner as described above.

The second mode in which the method of this invention will be described in further detail by way of example as follows:

FIG. 4 schematically shows one example of an apparatus used to carry out the method of this invention. The apparatus comprises an air-conditioned room 1 measuring 300 cm wide, 400 cm long and 300 cm high. The room 1 includes a heating device 2, an auxiliary heating device 2A, a cooling device 3, a humidifying and dehumidifying device 4 and a switch box 5. The device 4 comprises a humidifier 4A and a dehumidifier 4B. The switch box 5 includes a plurality of temperature and humidity control switches 5A and a corresponding number of time switches not shown. The temperature and humidity of the air in the room 1 are automatically controlled to their respective predetermined levels set by the time switches and the control switches 5A. The room 1 is provided in the floor with a hole or air inlet 6, while the ceiling of the room 1 is provided with an air outlet 7. Fresh air is supplied into the room 1 through the air inlet 6 and the room 1 is partially purged through the air outlet 7, whereby adequate ventilation is maintained in the room 1. The room 1 further includes a pressure reducing device 8. A vacuum pump 8A is provided outside the room 1 and connected to the pressure reducing device 8, whereby a desired level of pressure reduction is obtained within the room 1. In the center of the room 1, there is provided a rack 10 at a height of 30 cm above the floor. The rack 10 is adapted to support a plurality of test boxes 9 thereon. The room 1 further includes a plurality of fans 11 which are operable to uniformly stir the air within the room 1. The numeral 12 indicates doors.

Green coffee beans, previously conventionally dried subsequent to harvesting, of the type known as Colombia Medellin Excelso are chosen for testing purposes. A lot comprising 10 kg of these coffee beans is forcibly subjected to ill-treatment under severe adverse conditions which renders them undesirable for roasting. This ill-treatment is effected at a temperature of 39.5° C. to 40° C. and with a relative humidity of 88% without any ventilation to produce test samples. The sample undesirable beans thus obtained have a very objectionable rancid smell and other undesirable characteristics just as if they had been stored in an ill-ventilated place during the hot and humid summer. The sample beans are brought into the room 1 wherein the temperature is controlled at 15° C. and the humidity at 45%. Each test box 9 is made of plastic material and measures 64 cm long, 38 cm wide and 15 cm deep. Each box 9 is provided with a multiplicity of ventilating apertures in its bottom. The sample beans are divided into 18 lots. A piece of hemp cloth is placed in the bottom of each box 9 to provide better thermal insulation. Each lot of sample beans is put in one box 9 and the box 9 is placed in the reduced pressure chamber 8. The reduced pressure chamber 8 is closed and the vacuum pump 8A is operated to produce a predetermined level of pressure reduction in the chamber 8. Eighteen combinations of pressure and time are employed to treat the 18 lots of sample beans, respectively, one after another in the reduced pressure chamber 8, as shown in the following table and in FIG. 7:

| Absolute Pressure mm Hg | Time for Treatment under Reduced Pressure, min. | | | | |
| --- | --- | --- | --- | --- | --- |
| 650 | — | 30 | 45 | 60 | 90 |
| 500 | 25 | 30 | 45 | 60 | 90 |
| 250 | 25 | 30 | 45 | 60 | 90 |
| 6 | 25 | 30 | 45 | 60 | — |

Each lot of sample coffee beans is treated under one of the foregoing pressure and time combinations and the box 9 is taken out from the chamber 8. A piece of hemp cloth is placed over the top of the box 8. The box 9 is then placed on the rack 10 and each lot of sample coffee beans is treated for 12 hours for flavor development under the temperature and humidity control to be hereinafter described.

Figure 5:
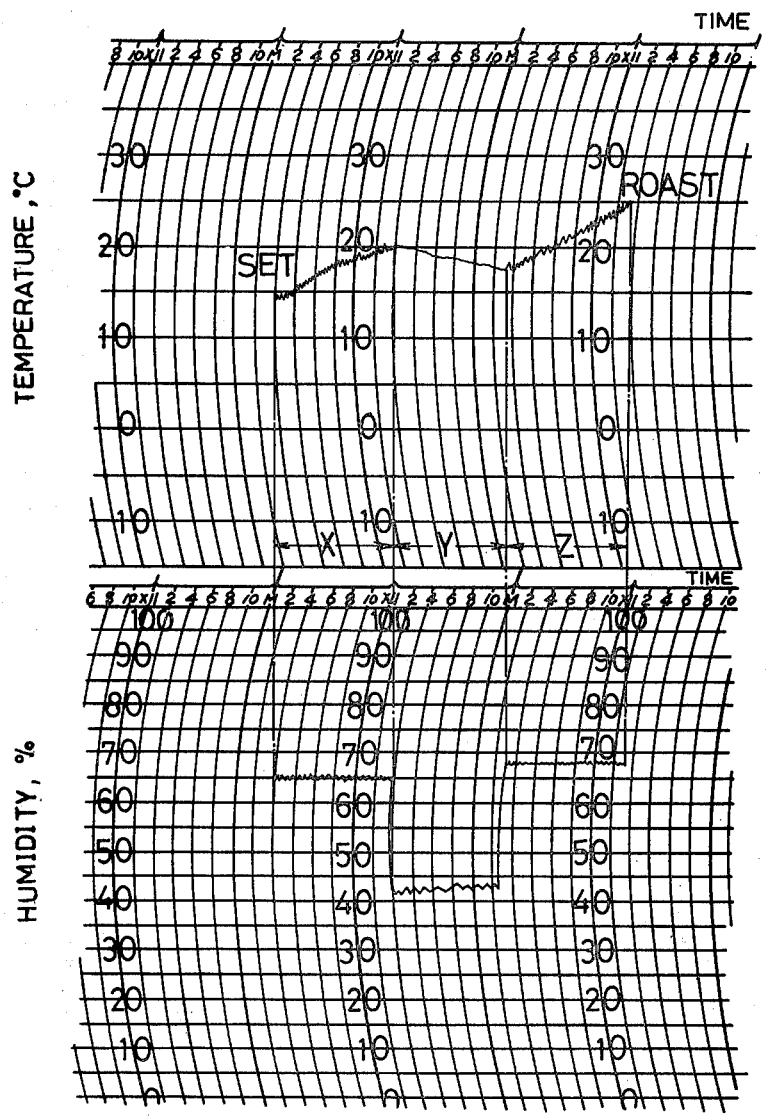
FIG. 5 shows graphs illustrating the exemplary control of the temperature and humidity, respectively, of the air in the apparatus illustrated in FIG. 4.

As shown in FIG. 5, the humidity of the air in the room 1 is maintained at a substantially constant level of 65% over the time of 12 hours and the temperature is gradually increased from 15° C. to 20° C., as indicated at section X in FIG. 5. The coffee beans thus treated are inspected by sampling with respect to the flavor obtained. Insofar as the sample coffee beans are the products of a severe ill-treatment as described above, the results of inspection indicate that no coffee beans in any of the lots tested acquire a satisfactorily good aroma. Therefore, the entire operation is repeated under different conditions. The coffee beans are allowed to dry again in the room 1 at a temperature gradually decreasing from 20° C. to 18° C. with a substantially constant humidity of 42% over a period of 12 hours as indicated at section Y in FIG. 5. Then, the humidity is increased to 67%. The coffee beans are treated for their development for 12 hours at a temperature gradually increasing from 18° C. to 25° C. with a substantially constant humidity of 67% as indicated at section Z in FIG. 5. The coffee beans thus treated are roasted for about 15 minutes at a temperature of about 190° C. Coffee is made and its quality is inspected.

Figure 6:
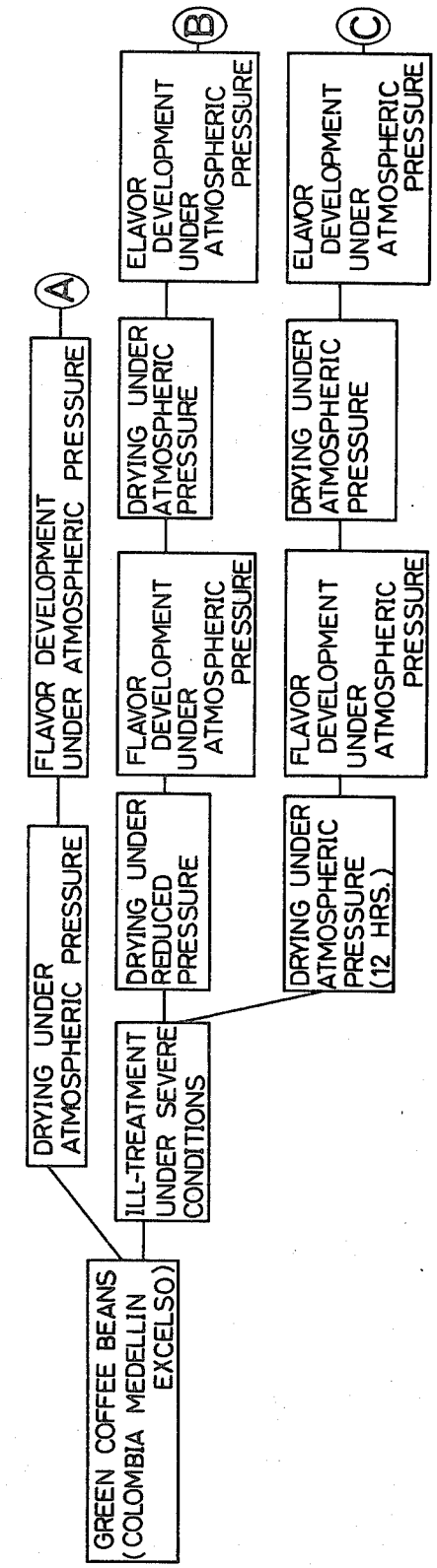
FIG. 6 is a flow diagram of three embodiments, A, B and C, of the method of the invention in which process B embodies the step of FIG. 3 for the purpose of comparison of the results of treatment thereby with those by the other methods.

As illustrated in FIG. 6, sample green coffee beans, Colombia Medellin Excelso, are divided into three groups and these three groups of coffee beans are treated under different conditions for comparison purposes as follows:

FIG. 6 is primarily intended to illustrate the problems attendant the treatment of previously conventionally dried undesirable green coffee beans that have been subjected to ill-treatment under severe conditions and are therefore very highly undesirable.

A. Process A comprises drying and flavor developing treatment, both under atmospheric pressure. Sample previously conventionally dired desirable green coffee beans are used as a control sample, without subjecting them to treatment to simulate adverse treatment. The products of Process A are considered as standard or reference products.

B. Coffee beans tested by Process B receive preliminary ill-treatment under severe conditions as set forth above. Process B comprises the steps, in sequence of;
drying under reduced pressure;
flavor developing treatment under atmospheric pressure;
drying under atmospheric pressure; and
flavor developing treatment under atmospheric pressure again.

It will be observed that the operation is performed in part under reduced pressure in Process B in accordance with the above discussed second mode of the invention.

C. In Process C, too, sample coffee beans are subjected to preliminary ill-treatment under severe conditions as set forth above. Process C then comprises the steps, in sequence, of:
drying under atmospheric pressure for 12 hours;
flavor developing treatment under atmospheric pressure;
drying under atmospheric pressure again; and
flavor developing treatment under atmospheric pressure again.

The entire Process C is carried out under atmospheric pressure.

The products of treatment by Process B, namely the coffee beans treated according to the second mode of the method of this invention, are compared with the products by Processes A and C, respectively. The comparison between the products by control Process A and those by Process B indicates that both are equal in the results of treatment obtained and show equally good aromatic qualities upon roasting and also when coffee is brewed therefrom. On the other hand, Process C fails to restore the qualities of coffee beans to the level prior to the ill-treatment. The coffee beans treated by Process C still retain a very objectionable smell and are useless. It will be understood that these results with respect to Process B are not inconsistant with the method of the invention in its broadest aspect, but merely illustrate that some green beans are so very undesirable that they will have to be treated by the second mode of the invention rather than the first mode of the invention to render them desirable.

More specifically, the products by Process B treated under the conditions represented by the pressure and time combinations in the vicinity of curve II in FIG. 7 are particularly good and comparable in quality to the products by Process A treated without receiving any preliminary ill-treatment. Even among the products by Process B, those treated by utilizing the pressure and time combinations falling within area I in FIG. 7 are not fully devoid of the objectionable smell generated as a result of the severe ill-treatment, but still retain some undesirable smell. The products by Process B treated by utilizing the pressure and time combinations falling within area III in FIG. 7 do not retain any objectionable smell, but fail to acquire a satisfactory good flavor during the flavor developing treatment under atmospheric pressure.

It will thus be noted from the above discussion of Process B that the second mode of practising the method of this invention, utilizing a reduced pressure in the first drying step is particularly useful for treating green coffee beans having particularly undesirable characteristics due to their storage under bad conditions, whereby any differences in the qualities of the coffee beans due to thier badly controlled storage conditions are more readily substantially unified to thereby subsequently in the second step facilitate development of the flavor or taste and aroma generally associated with coffee when roasted and brewed therefrom. The initial step of drying is carried out under reduced pressure, and accordingly, requires a considerably shorter time than when it is performed under atmospheric pressure. If sampling inspection indicates any necessity of additional treatment, however, the coffee beans may be allowed to dry again under reduced pressure, such as illustrated in phantom lines in FIG. 3, or alternatively under atmospheric pressure. Once coffee beans are appropriately dried, they may then be given additional treatment for flavor development in a manner similar to that described hereinbefore in connection with the first mode of carrying out the method of this invention entirely under atmospheric pressure whereby the coffee beans acquire a uniformly good flavor and aroma.

It will be understood that if the coffee beans thus treated are not immediately roasted, it will be necessary to store them under such conditions as may be controlled well enough to prevent the coffee beans from acquiring undesirable characteristics again before they are roasted. If they are stored under such proper conditions, they will require only a short time for drying when they are going to be roasted. While a single type of green coffee beans (Colombia Medellin Excelso) are used in the example described to show the second mode of carrying out the method of this invention, it will readily be understood that the method hereinabove described is equally useful and advantageous in treating a mixture of two or more different types of coffee beans stored under different adverse conditions prior to roasting.

Although not specifically stated heretofore, it will be understood that undesirable previously conventionally dried green coffee beans being treated in accordance with the present invention are generally characterized by a moisture concentration that, expressed as humidity, is greater than the humidity at which the beans are subjected to the first essential "drying" step.

In the graphs comprising FIG. -a through FIG. -w and FIG. L-a through FIG. L-h, the letters A and B represent time, temperature, humidity, or time, temperature and humidity conditions which previously dried undesirable green coffee beans have been subjected to in the first and second essential steps. The letters C and D refer to the subsequent optional additional steps. It will be understood that the undesirable beans so processed are in each instance taken from a single batch of previously conventionally dried green beans that are undesirable and not suitable for roasting. It will be further understood that these graphs pertain to manipulative steps that were performed at atmospheric pressure, namely mode one of the invention, and using apparatus as schematically illustrated in FIG. 4.

With respect to FIG. -a, the coffee brewed from undesirable green beans treated under these temperature conditions without specific regard for establishing and controlling predetermined humidity conditions and roasted is often somewhat rough to the tongue and of relatively light color.

With respect to FIG. -b, the coffee often has a strong bitterness when brewed from the beans treated under these temperature conditions and then ground and roasted.

With respect to FIG. -c, coffee brewed from beans so treated is neither soft nor rough to the tongue, and presents little bitterness.

With respect to FIG. -d, coffee brewed from undesirable green beans treated under these temperature conditions while often soft to the tongue and rich in color, is sometimes bitter.

With respect to FIG. -e, roasted beans, powder thereof and coffee brewed therefrom often have a burnt aroma.

With respect to FIG. -f, the temperature increase indicated by curve segments (1) and (2) at A and B and the humidity elevation (5) at B are not sufficient to render undesirable green beans suitable for flavor development, because of the humidity increase (4) at A over the humidity of the environment in which the beans were stored prior to the treatment as indicated by curve segment (3). Thus, it is often necessary to add steps C and D in order to develop and increase a smell of fermentation to a desirable degree in the beans treated.

With respect to FIG. -g, coffee beans so treated acquire different degrees of aroma depending upon the gradient $\theta$ of temperature elevation.

With respect to FIG. -h, initial temperature equilibrium as indicated by curve segment (1) sometimes results in the developing of sweet taste and relish in coffee.

With respect to FIG. -i, unless during the flavor development process comprising step B, a sufficient circulation of air or ventilation is provided through the area in which beans contact the treating atmosphere directly or indirectly, the beans treated give out a very offensive or rancid smell and the coffee brewed from those beans roasted is entirely objectionable both in taste and smell.

With respect to FIG. -j, coffee beans so treated are characterized by a relatively poor aroma.

With respect to FIG. -k, a sudden increase in temperature as at (1) during the attempt to develop a desirable fermentation aroma in beans often prevents satisfactory development of such aroma to some extent, the influence of such sudden temperature change depending on the quantity of the beans being treated and the shape of the container in which the beans are treated.

With respect to FIG. -l, the relatively short period of time devoted to flavor development results in bitter coffee brewed from beans so treated.

With respect to FIG. -m, a temperature drop during the flavor development step B imparts a strong astringency to coffee. The degree of astringency, however, appears to depend to some extent upon the quantity of the beans treated and the shape of the container in which the beans are treated.

With respect to FIG. -n, treatment under these conditions results in the undesirable flavor which the beans possessed prior to treatment being removed and the beans are thus rendered suitable for development of a desirable fermentation aroma.

With respect to FIG. -o, treatment under these conditions gives similar results to those obtained by the treatment of FIG. -f.

With respect to FIG. -p, this treatment gives substantially the same results as those obtained by the treatment of FIG. -n, indicating that humidity variation is not as critical as temperature changes.

With respect to FIG. -q, this figure shows that insufficient drying in A does not render beans suitable for subsequent flavor development in B. Treatment over a prolonged length of time is often necessary under these conditions. Moreover, coffee treated in this manner oftentimes develops bitterness, as in the case of treatment of FIG. -b.

With respect to FIG. -r, humidity elevation as at (2) during the latter half of the A step tends to develop astringency, much as a temperature drop does. Moreover, a short treatment time tends to prevent development of a good flavor.

With respect to FIG. -s, the level of humidity affects the "body" and softness to the tongue of coffee brewed from beans so treated.

With respect to FIG. -t, the treatment in this manner provides substantially the same results as that of FIG. -s.

With respect to FIG. -u, the treatment in this manner provides substantially the same results as that of FIG. -i.

With respect to FIG. -v, an insufficient humidity increase from the A step to the B step tends to result in poor flavor development.

With respect to FIG. -w, treatment in this manner tends to prevent sufficient development of a desirable aroma of fermentation, or even causes the beans to lose such smell developed, though the influence depends on the quantity of the beans treated and the shape of the container in which the beans are treated.

With respect to FIG. L-a, coffee brewed from beans treated in this manner is characterized by an appreciable sourness and roughness to the tongue.

With respect to FIG. L-b, when beans are subjected to a sudden temperature increase after they are treated in accordance with the requirements of step A and even in which a temperature curve including a temperature as low as 0° C. is present, the beans treated have a satisfactory good flavor.

With respect to FIG. L-c, when beans are treated at these temperature and humidity ranges for the times shown, the coffee brewed therefrom begins to have undesirable characteristics including even certain of the undesirable flavor characteristics which the beans possessed prior to the treatment.

With respect to FIG. L-d, treatment under these conditions makes difficult the development of a strong desirable aroma of fermentation or the satisfactory increase of such aroma in the beans. The beans thus treated are not suitable for brewing coffee having a desirable flavor and aroma.

With respect to FIG. L-e, coffee brewed from beans treated in this manner begins to develop an appreciable degree of undesirable flavor.

With respect to FIG. L-f, beans treated in this manner hardly develop a satisfactory aroma of fermentation or show any satisfactory increase in whatever fermentation aroma which may have been present. Thus, coffee tends to lack a rich, desirable flavor.

With respect to FIG. L-g, beans treated under these conditions have an excessive or even rancid fermentation aroma. The coffee brewed from those beans does not have a satisfactory body.

With respect to FIG. L-h, beans treated in this manner hardly develop a satisfactory aroma of fermentation or show any satisfactory increase in whatever fermentation aroma may have been present. Thus, coffee tends to lack in a rich and unique flavor.

When considering the illustrative and comparative methods shown in the above discussed graphs it will be understood that the humidity maintained during steps A, C or B, D of FIG. -a through FIG. -e and FIG. -g through FIG. -m can be maintained within the range of about 30% to about 70% in steps A and C and within the range of about 55% to about 90% in steps B and D. More specifically, the humidity maintained with respect to FIG. -a through FIG. -e and FIG. -g through FIG. -m is the humidity graphically shown in FIG. -n, namely about 54% during steps A or C and about 70% during steps B or D.

Similarly, with respect to the temperature maintained during steps A, C or B, D of FIG. -n through FIG. -w it will be understood that the temperature can be maintained within the range of about 0° C. to about 30° C. in steps A and C and within the range of about 10° C. to about 30° C. in steps B and D. More specifically, the temperature maintained with respect to FIG. -n through FIG. -w is the temperature graphically shown in FIG. -h, namely about 20° C. during steps A or C and from an initial temperature of about 20° C. to a final temperature of about 23° C. in steps B or D.

From the foregoing illustrative and comparative tests it will be appreciated that determination of the manipulative steps comprising the invention does not result from mere experimentation or obvious selection of conditions of temperature, humidity, air circulation or pressure, or length of treatment, that provide the consistently predictable desirable results shown herein. The invention enables the consistently reliable rehabilitation of previously conventionally dried green coffee beans that have become undesirable and are no longer suitable for conventional roasting for the production of roasted coffee beans from which a desirable coffee beverage can be brewed. Thus, the invention fills a long felt need for rendering undesirable green coffee beans consistently desirable for roasting by conventional methods.

What is claimed is:

1. In the processing of green coffee beans wherein said beans are dried and thereafter roasted and said dried beans, which due to storage conditions have suffered marked damage and are no longer characterized by desirable flavor properties, the improvement which comprises treating the beans within a treatment chamber to improve the flavor properties in preparation for said roasting by the essential additional sequential steps of:

(a) tempering the previously dried green coffee beans in a first controlled atmosphere at atmospheric pressure at a first temperature range within a range of about 0 degrees C. to about 26 degrees C. and with a first humidity range within a range of about 45% to about 70% for not less than about 6 hours such that said tempering reduces the water content of the beans below that prior to said tempering;

(b) heating and further humidifying the green beans tempered as in (a) in a second controlled atmosphere under atmospheric pressure for a period of at least 6 hours and not more than 24 hours such that flavor development is effected, at a second temperature higher than any temperature value in said first temperature range without substantially reducing said second temperature, wherein said second temperature ranges from about 10 degrees C. to about 30 degrees C. and a second humidity above any humidity value in said first humidity range without reduction below any humidity value in said first humidity range wherein said second humidity ranges from about 55% to about 90%; and said step (b) is carried forth in the presence of sufficient circulation of air through the treatment chamber to purge undesirable constituents evolved.

2. The method of claim 1 wherein said step (b) is carried forth under the circulation of air through the treatment chamber at the rate of about 25 m$^3$ per hour.

3. The method of claim 1 wherein said step (b) is carried forth under the circulation of air through the treatment chamber at the rate of about 25 m$^3$ per hour for the treatment of green coffee beans in the amount of up to about 40 kg.

4. The method of claim 1, further including:

(c) tempering said green coffee beans of (b) under atmospheric pressure at a third temperature substantially equal to said second temperature, and with a third humidity lower than said second humidity; and
(d) heating and further humidifying said green coffee beans of (c) under atmospheric pressure at a fourth temperature higher than said third temperature, and with a fourth humidity higher than said third humidity.

5. The method of claim 1, wherein said step (a) is also carried forth in the presence of sufficient circulation of air through the treatment chamber to purge undesirable constituents evolved.

* * * * *